(12) United States Patent
Jung

(10) Patent No.: US 7,852,816 B2
(45) Date of Patent: Dec. 14, 2010

(54) APPARATUS AND METHOD FOR PACKET TRANSMISSION SCHEDULING IN WIRELESS AD-HOC NETWORK

(75) Inventor: Yong-Jae Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 728 days.

(21) Appl. No.: 11/546,377

(22) Filed: Oct. 12, 2006

(65) Prior Publication Data

US 2007/0147321 A1  Jun. 28, 2007

(30) Foreign Application Priority Data

Dec. 27, 2005  (KR) .................. 10-2005-0130951

(51) Int. Cl.
*H04W 4/00* (2009.01)
(52) U.S. Cl. ...................................... 370/338
(58) Field of Classification Search .................. 370/338
See application file for complete search history.

(56) References Cited

U.S. PATENT DOCUMENTS

| 5,109,384 | A  | * | 4/1992  | Tseung ........................ 714/748 |
| 2002/0075941 | A1 | * | 6/2002  | Souissi et al. ............... 375/133 |
| 2004/0228293 | A1 | * | 11/2004 | Choi et al. .................. 370/311 |

FOREIGN PATENT DOCUMENTS

WO   WO2005006658   *  1/2005

OTHER PUBLICATIONS

Tseng, et. al., Power Saving Protocols for IEEE 802.11-Based Multi-Hop Ad Hoc Networks, INFOCOM 2002. Twenty-First Annual Joint Conference of the IEEE Computation communication Societies. Porceedings. IEEE vol. 1 p. 200-209.*

Jung et. al. An Energy Efficient MAC Protocol for Wireless LANs, INFOCOM 2002. Twenty-First Annual Joint Conference of the IEEE Computation communication Societies. Porceedings. IEEE vol. 3 p. 1756-1764.*

Fan et. al. Admission Control for Variable Bit Rate Traffic in IEEE 802.1, Communication, 2004 and the 5th International Symposium on Multi Dimensional Mobile Communications Proceedings. The 2004 Joint Conference of the 10th Asia-Pacific Conference On, vol. 1, Aug. 29-Sep. 1, 2004, pp. 272-277.*

* cited by examiner

*Primary Examiner*—Patrick N Edouard
*Assistant Examiner*—Matthew W Genack
(74) *Attorney, Agent, or Firm*—H.C. Park & Associates, PLC

(57) ABSTRACT

A method and apparatus for transmitting packets is capable of saving energy in a mobile ad-hoc network. In the method and apparatus, a phenomenon of abnormality is prevented by one or more mobile terminals exchanging with each other, in an Ad-hoc Traffic Indication Message (ATIM) window period, an ATIM frame containing information about the number of packets attempted to be transmitted and information about the number of continuous transmission failures. As a result of the exchange, each terminal determines transmission priorities of itself and the other terminals using the information. Thus, each mobile terminal can fairly transmit data during a data transmission window.

15 Claims, 6 Drawing Sheets

APPARATUS AND METHOD FOR PACKET TRANSMISSION SCHEDULING IN WIRELESS AD-HOC NETWORK

CLAIM OF PRIORITY

This application makes reference to, incorporates the same herein, and claims all benefits accruing under 35 U.S.C. §119 from an application for APPARATUS AND METHOD FOR PACKET TRANSMISSION SCHEDULING IN WIRELESS AD-HOC NETWORK earlier filed in the Korean Intellectual Property Office on the 27$^{th}$ of December 2005 and there duly assigned Serial No. 10-2005-0130951.

BACKGROUND OF THE INVENTION

1. Technical Field

The present invention relates to a method and apparatus for transmitting packets, the method and apparatus being capable of saving energy in a mobile ad-hoc network.

2. Related Art

With the ongoing development of wireless technology, a variety of mobile devices have been introduced. The mobile devices provide convenient portability but have a small display screen, an inconvenient interface, small battery capacity, etc. Batteries have been extensively studied. Since mobile devices are powered by a battery, efficient consumption of power is a critical consideration in the field of mobile devices. In particular, a Mobile Ad-hoc NETwork (MANET) saves energy in a power saving mode (PSM).

A mobile ad-hoc network is a network in which communication, such as data transmission and reception, is performed by routing between mobile terminals in a state where there is no network infrastructure. The ad-hoc network has no central control system, such as a base station or an access point. Mobile terminals directly transmit and receive data to and from each other. Accordingly, each mobile terminal participating in the network should act as a router, a server and the like to transmit and receive packets without the assistance of a base station or an access point.

Such an ad-hoc network is called an Independent Basic Service Set (IBSS). In the ad-hoc network, a mobile terminal is in direct communication with other mobile terminals present in a communication area. Generally, the ad-hoc network includes some mobile terminals that are active during a specific period with a specific intention. For example, the ad-hoc network may be temporarily set up in a conference room.

In the IEEE 802.11 wireless local area network (WLAN) standard, a distributed coordination function (DCF) is defined in a medium access control (MAC) protocol, which supports a mobile ad-hoc network. For saving power, the PSM is defined as a standard.

In the PSM, the mobile terminal has three power states: an off state, an awake state, and a doze state. In the off state, the mobile terminal does not operate, and thus consumes no power. In the awake state, the mobile terminal generally performs data transmission and reception while consuming necessary power. On the other hand, in the doze state, the mobile terminal does not perform data transmission and reception but remains in a standby state for a predetermined time period, during which less power is consumed than in the awake state.

In a DCF-based medium access control method, divided fixed periods of time are defined as beacon intervals. The fixed periods of time are used for data transmission. Each beacon interval includes an Ad-hoc Traffic Indication Message (ATIM) window and a data transmission window. The ATIM window is a period during which mobile terminals exchange setup information with each other to transmit and receive packets. The data transmission window is a period during which the mobile terminals actually transmit data packets based on information that is exchanged in the ATIM window.

In the ATIM window, each mobile terminal in the ad-hoc network is switched to the awake state and exchanges an ATIM frame with a neighboring mobile terminal so as to perform data transmission to the mobile terminal.

The mobile terminals, which transmit or receive the ATIM frame, stay in the awake state to transmit data in the data transmission window. On the other hand, mobile terminals that do not transmit or receive the ATIM frame are switched to the doze state to save power since they do not have to perform data communication. In the awake state, the mobile terminals occupy a medium through free competition to transmit and receive data packets. This data packet transmission and reception process continues until an ATIM window of the next beacon interval is initiated. Accordingly, one beacon interval is completed and data packet transmission is continued through a hop-by-hop process. The packet transmission and reception process of a mobile terminal in the above-described PSM method will be now described.

In the above-described packet transmission method, mobile terminals compete for data transmission through free competition in the data transmission window, and mobile terminals having fewer packets to transmit cannot be switched to the doze state because they cannot transmit packets stored in a buffer when continuously failing in transmission competition. This degrades energy saving efficiency.

SUMMARY OF THE INVENTION

Accordingly, it is an object of the present invention to provide a method and apparatus for transmitting packets, the method and apparatus being capable of saving mobile terminal energy using an Ad-hoc Traffic Indication Message (ATIM) frame which is transmitted between the mobile terminals, and which contains information about the number of packets to be transmitted and the number of transmission failures.

According to an aspect of the present invention, a method for transmitting packets between terminals belonging to a mobile ad-hoc network comprises the steps of: exchanging, by the terminals in the ad-hoc network, an ATIM frame containing information about the number of packets attempted to be transmitted and the number of continuous transmission failures between the terminals in the ATIM window; determining an inter-terminal transmission priority based on the information about the number of packets attempted to be transmitted and the number of continuous transmission failures; and sequentially transmitting and receiving, by each terminal, packets according to the determined transmission priority in a data transmission window.

The step of determining the transmission priority preferably comprises the step of assigning a higher transmission priority to a terminal having a smaller final priority value as calculated by the following equation, TOTAL_PRI=NUM/ $10^{pri}$.

The method further comprises the steps of: incrementing, by a terminal that does not complete packet transmission in the data transmission window, the number of continuous transmission failures by one; and resetting, by a terminal that completes packet transmission in the data transmission window, the number of continuous transmission failures to zero.

The method preferably further comprises the step of switching to a doze state a terminal having no packet to be transmitted or completing packet transmission in the data transmission window. The method may further comprise the step of switching the terminal, switched to the doze state, to the awake state when the next ATIM window is initiated.

The step of exchanging the ATIM frame preferably comprises the steps of: transmitting, by a transmitting terminal, the ATIM frame; and transmitting, by a terminal receiving the ATIM frame, an Ack signal to the transmitting terminal.

According to another aspect of the present invention, a terminal for transmitting and receiving packets in an ad-hoc network comprises: a packet transceiver for transmitting and receiving the packets according to an ad-hoc mode; and a controller for exchanging an ATIM frame containing information about the number of packets attempted to be transmitted and the number of continuous transmission failures with other terminals on the ad-hoc network in an ATIM window so as to determine an inter-terminal transmission priority, and for transmitting and receiving the packets according to the determined transmission priority in a data transmission window.

The controller preferably comprises: an ATIM frame generating module for generating the ATIM frame containing information about the number of packets attempted to be transmitted by the terminal and the number of continuous transmission failures; a priority determining module for receiving, from other terminals on the ad-hoc network, the ATIM frame containing the information about the number of packets attempted to be transmitted and the number of continuous transmission failures, and for determining the inter-terminal transmission priority based on the information; and a transmission control module for occupying a medium so as to transmit a data packet according to the determined transmission priority in the data transmission window.

The priority determining module preferably assigns a higher transmission priority to a terminal having a smaller final priority value as calculated by the following equation, $TOTAL\_PRI = NUM/10^{pri}$.

The transmission control module preferably increments the number of continuous transmission failures by one when packet transmission is not completed in the data transmission window, and resets the number of continuous transmission failures to zero when the packet transmission is completed in the data transmission window.

The controller may comprise a mode switching module for switching the terminal to the doze state when there is no packet to be transmitted or packet transmission is completed in the data transmission window. The mode switching module may switch the terminal to the awake state when the ATIM window is initiated.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Hereinafter, a method and apparatus for transmitting packets, the method and apparatus being capable of saving mobile terminal energy using an Ad-hoc Traffic Indication Message (ATIM) frame transmitted between the mobile terminals, the ATIM frame containing information about the number of packets to be transmitted and the number of transmission failures, will be described in detail with reference to the accompanying drawings.

Figure 1:
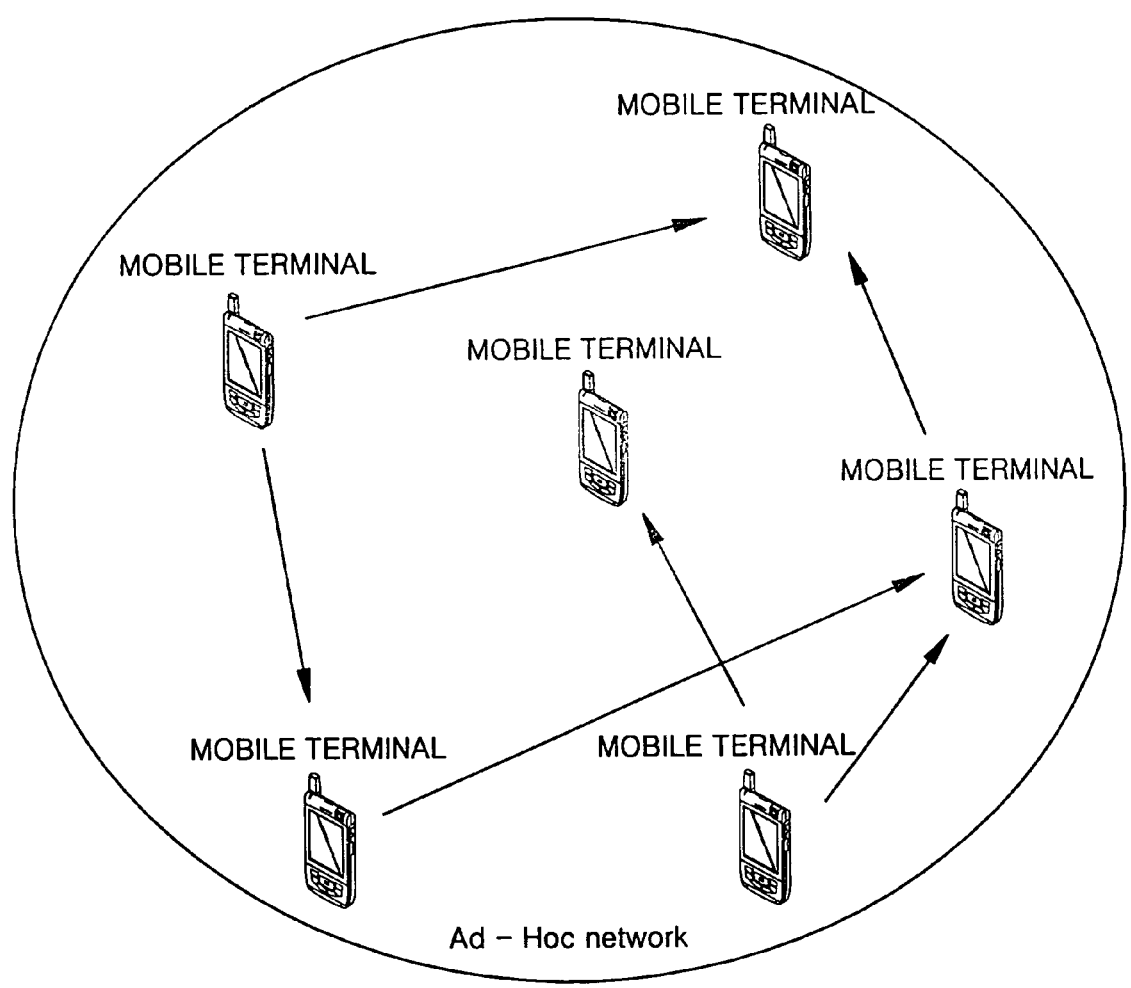
FIG. 1 is a block diagram of an ad-hoc network.

FIG. 1 is a block diagram of an ad-hoc network. A mobile ad-hoc network is a network in which communication, such as data transmission and reception, is performed by routing between mobile terminals in a state where there is no network infrastructure. Referring to FIG. 1, the ad-hoc network has no central control system, such as a base station or an access point. Mobile terminals directly transmit and receive data to and from each other. Accordingly, each mobile terminal participating in the network should act as a router, a server and the like so as to transmit and receive packets without the assistance of a base station or an access point.

Such an ad-hoc network is called an Independent Basic Service Set (IBSS). In the ad-hoc network, a mobile terminal is in direct communication with other mobile terminals present in a communication area. Generally, the ad-hoc network includes some mobile terminals that are active during a specific period with a specific intention. For example, the ad-hoc network may be temporarily set up in a conference room.

Figure 2:
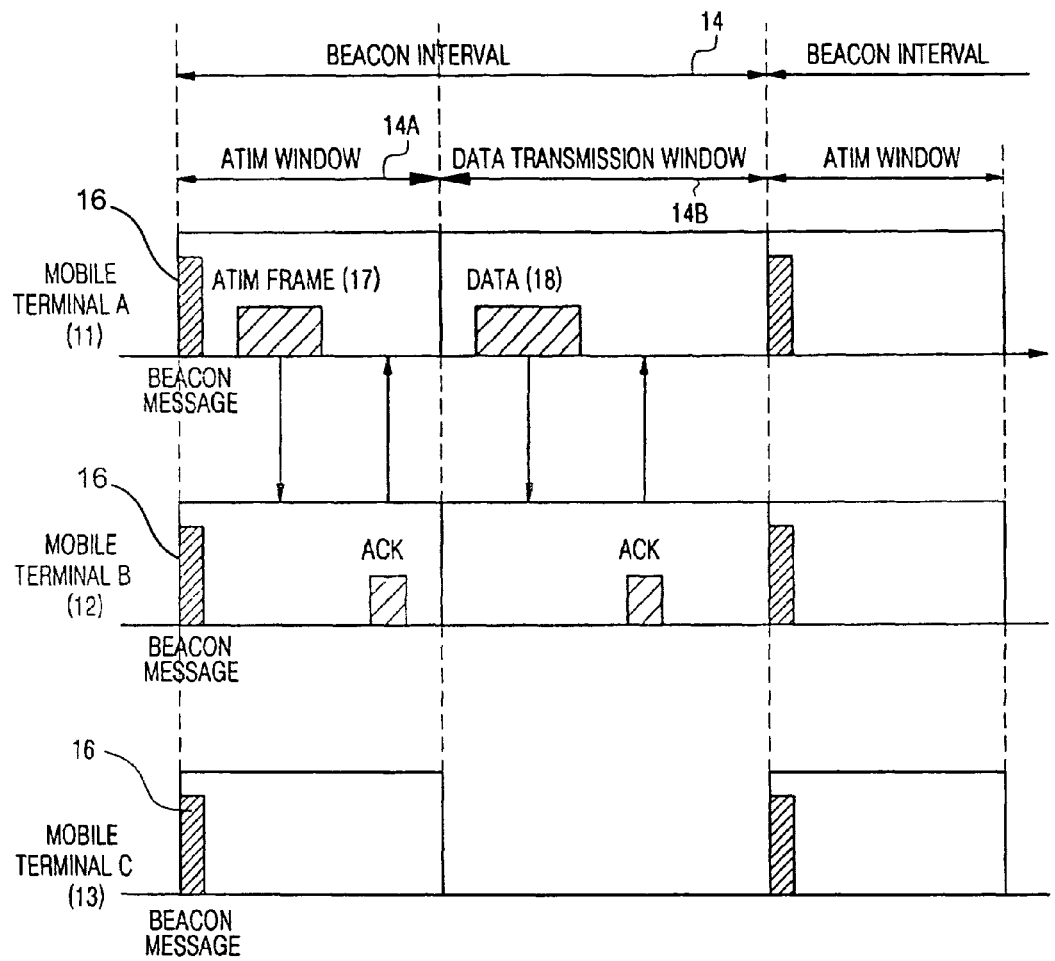
FIG. 2 is a diagram of a method for transmitting packets in an ad-hoc network.

FIG. 2 is a diagram of a method for transmitting packets in an ad-hoc network. Referring to FIG. 2, the ad-hoc network includes mobile terminals A 11, B 12 and C 13. The mobile terminal A 11 has one packet to transmit to the mobile terminal B 12, and the mobile terminal C 13 has no packets to transmit or receive.

First, an ATIM window 14A of the first beacon interval 14 is initiated in response to a beacon message 16. In the ATIM window 14A, the mobile terminals A 11, B 12 and C 13 remain in the awake state and exchange the ATIM frame 17 with each other. As shown in FIG. 2, the mobile terminal A 11 desiring to transmit a packet transmits the ATIM frame 17 to the mobile terminal B 12, and the mobile terminal B 12 transmits an acknowledgement (ACK) to the mobile terminal A 11.

In the data transmission window 14B, the mobile terminal A 11 transmits data to the mobile terminal B 12. Of course, the mobile terminal B 12 responds to data packet reception with the acknowledgment ACK to the mobile terminal A 11. In the data transmission, the nodes A and B stay in the awake state. On the other hand, since the mobile terminal C 13 does not transmit and receive the ATIM frame 17 in the ATIM window 14A, it recognizes that there are no packets to transmit and receive. Accordingly, the mobile terminal C 13 remains in the doze state in the data transmission window 14B.

Figure 3:
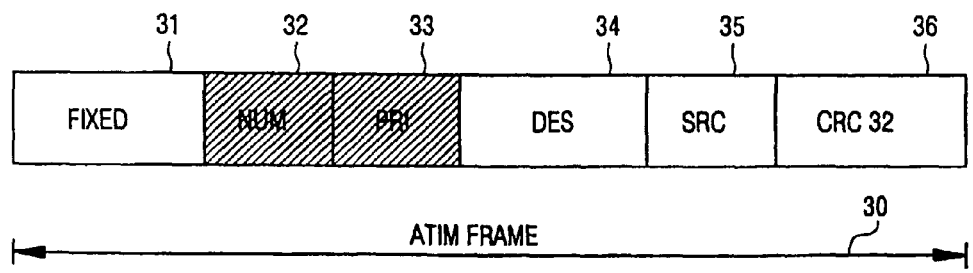
FIG. 3 is a block diagram of a format of an Ad-hoc Traffic Indication Message (ATIM) frame for a packet transmission method according to an exemplary embodiment of the present invention.

FIG. 3 is a block diagram of a format of an AITM frame for a packet transmission method according to an exemplary embodiment of the present invention.

Referring to FIG. 3, an ATIM frame 30 may include a FIXED field 31, an NUM field 32, a PRI field 33, a DES field 34, an SRC field 35, and a CRC 32 field 36.

The FIXED field 31 contains header information indicating that a data packet is an ATIM frame 30 conforming to a standard defined in IEEE 802.11. The DES field 34 and the SRC field 35 include a destination address and a source address, respectively, of the data packet. The CRC 32 field 36 includes data associated with a 32 bit CRC code. Such a CRC code is used to check whether an error is contained in a packet received by the mobile terminal during data communication, and to correct the error.

The NUM field 32 indicates the number of packets attempted to be transmitted in the data transmission window by the mobile terminal transmitting the ATIM frame 30. Each mobile terminal determines transmission priorities of the mobile terminals by considering the NUM field 32. Specifically, a mobile terminal having a smaller value in the NUM field 32 is assigned a higher transmission priority. For example, when the first and second mobile terminals have one and ten packets, respectively, the first mobile terminal is assigned a higher transmission priority than the second mobile terminal, and transmits its packets first. Of course, the number of packets attempted to be transmitted may be recognized by each mobile terminal retrieving data stored in the buffer. Packet transmission using the NUM field will be described in detail below with reference to FIG. 4.

The number of continuous transmission failures at one mobile terminal is stored in the PRI field 33. That is, information about the number of continuous beacon intervals during which data packet transmission is not completed is stored in the PRI field 33. For example, when a mobile terminal fails to complete data packet transmission in the data transmission window, it transmits an ATIM frame 30 containing the PRI field 33 having a value of 1 in the next ATIM window. Similarly, when the mobile terminal further fails to transmit all data packets in the next beacon interval, the PRI field 33 of the ATIM frame 30 transmitted in the next ATIM window will have a value of 2. On the other hand, when the mobile terminal transmits all of the data packets in the next beacon interval, the PRI field 33 of the next ATIM frame 30 is again reset to 0. The packet transmission method using the PRI information will be described below with reference to FIG. 5.

Figure 4:
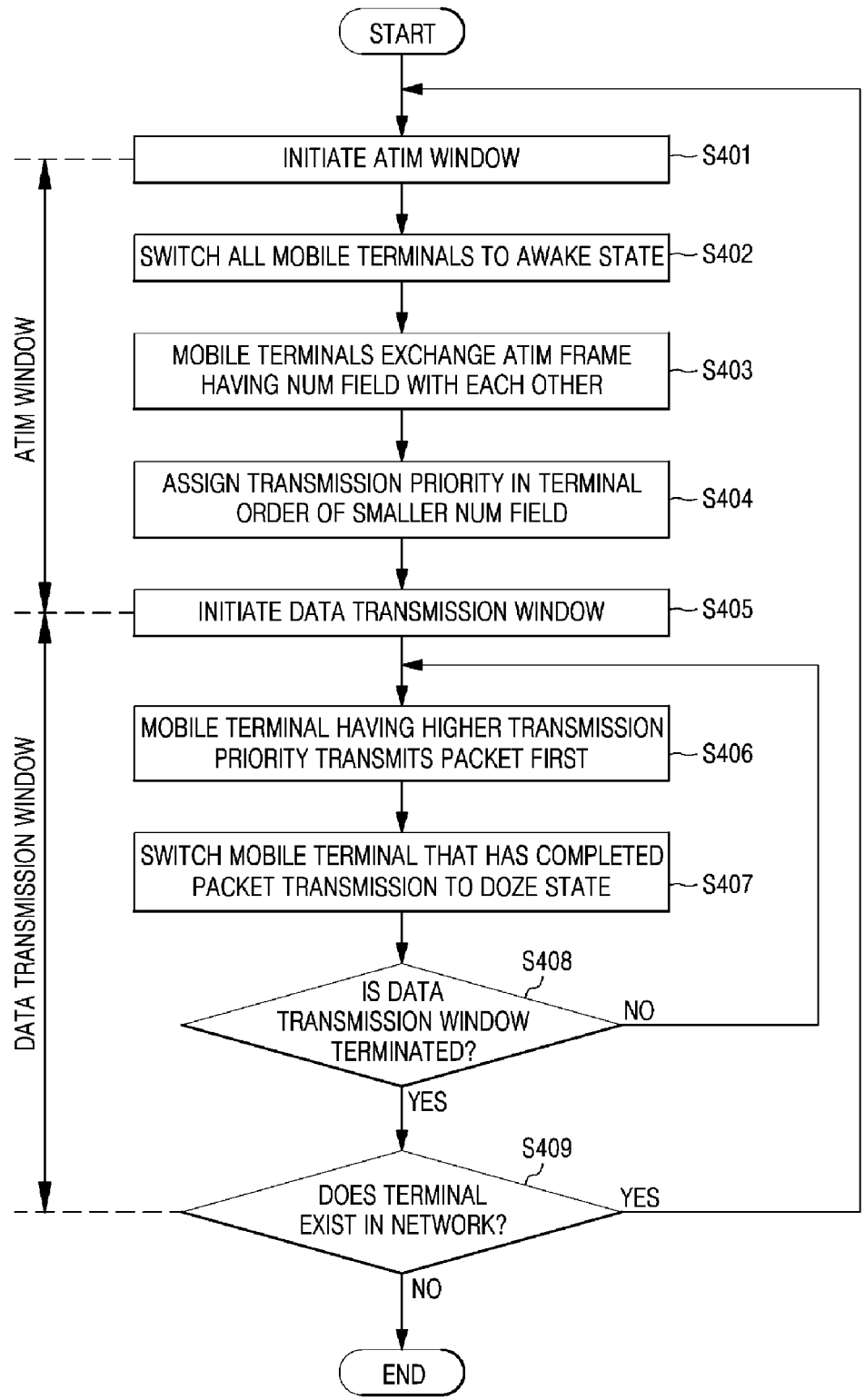
FIG. 4 is a flowchart of a method for transmitting packets in an ad-hoc network according to an exemplary embodiment of the present invention.

FIG. 4 is a flowchart of a method for transmitting packets in an ad-hoc network according to an exemplary embodiment of the present invention.

A method for determining transmission priority based on the number of packets to be transmitted and received by each mobile terminal, and for transmitting the packets according to the priority, which is enhanced compared to the packet transmission method described in FIG. 2, will be described with reference to FIG. 4. It is assumed that, in the packet transmission method, an NUM field is inserted into an ATIM frame which is exchanged in the ATIM window.

When the ATIM window is initiated through beacon message transmission and reception (S401), all mobile terminals in the ad-hoc network are switched to the awake state (S402). Furthermore, the mobile terminals in the network exchange the ATIM frame having the NUM field with each other (S403). Through such a process, each mobile terminal recognizes a mobile terminal desiring to transmit packets in one beacon interval, the number of packets attempted to be transmitted, and the like. Based on this information, a mobile terminal having the least packets to transmit is assigned the highest transmission priority (S404).

After a predetermined time elapses, the data transmission window is initiated (S405). The mobile terminal having the highest transmission priority assigned in S404 transmits a data packet first (S406). After each of the mobile terminals completes the packet transmission, they are switched to the doze state to save power (S407).

The mobile terminal determines whether the data transmission window for the packet transmission is terminated (S408). If the data transmission window is not terminated, the packet transmission process is repeated (S406 and S407). If the data transmission window is terminated, a determination is made as to whether there is a mobile terminal desiring to communicate in the ad-hoc network (S409). If there is a mobile terminal desiring to communicate, an ATIM window of a new beacon interval is initiated (S401). If it is determined in S409 that there are no mobile terminals requesting data transmission and reception, the process ends.

In the packet transmission method as described above, a mobile terminal having fewer packets for transmission preferentially transmits data and then enters the doze state, thereby more efficiently saving the power of the mobile terminal. However, such a packet transmission method has the following problems.

The number of packets to be transmitted and received in the ATIM window is calculated. In this case, a mobile terminal having a greater number of packets to transmit is assigned a lower priority. Eventually, the mobile terminal having a lower transmission priority attempts to transmit after other mobile terminals complete transmission. If the data transmission window ends in a state where packet transmission has not been completed, the mobile terminal should transmit the remaining packets in the next data transmission window. However, since new data to be transmitted may be added to the mobile terminal before the next data transmission window is reinitiated, there is a high probability that the mobile terminal will be assigned an even lower transmission priority in the next beacon interval. Accordingly, the mobile terminal may not complete packet transmission. This problem can be solved by determining a transmission order of the terminals by considering the number of transmission failures of the terminal, as well as the number of packets to be transmitted by the terminal. The method for determining a transmission priority of a mobile terminal by considering the number of transmission failures of the terminal and transmitting packets according to the priority will now be described.

Figure 5:
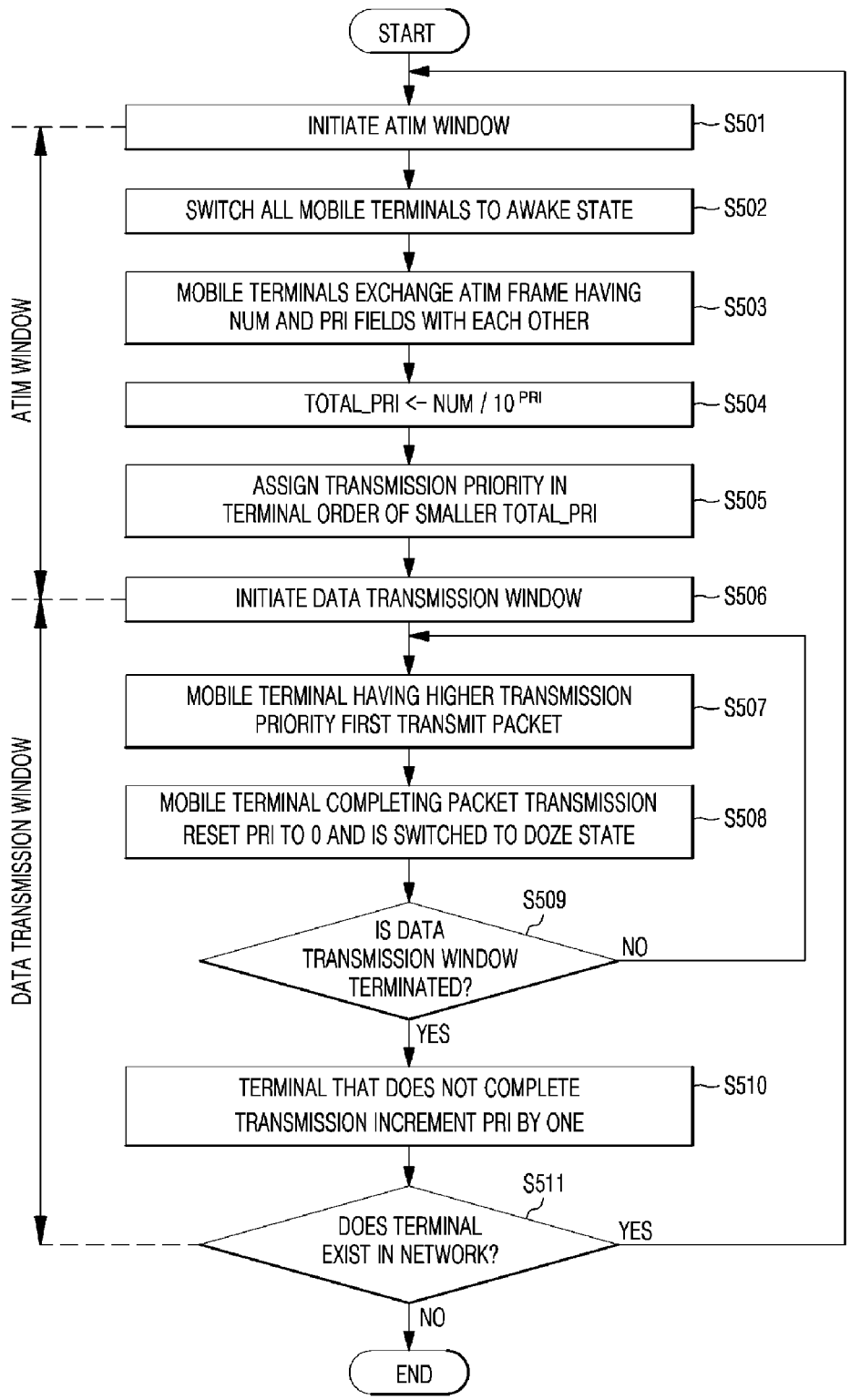
FIG. 5 is a flowchart of a method for transmitting packets in an ad-hoc network according to another exemplary embodiment of the present invention.

FIG. 5 is a flowchart of a method for transmitting packets in an ad-hoc network according to another exemplary embodiment of the present invention.

An ATIM window of a beacon interval is initiated through beacon message transmission and reception (S501), and all mobile terminals in the ad-hoc network, including mobile terminals switched to the doze state, are switched to the awake state (S502). The mobile terminals exchange an ATIM frame containing the NUM field and the PRI field with each other in the ATIM window (S503).

Each mobile terminal determines its own transmission priority, based on the NUM field and the PRI field of the exchanged ATIM frame. Specifically, each mobile terminal calculates an equation, $TOTAL\_PRI = NUM/10^{pri}$, for all mobile terminals in the network to obtain a final priority value TOTAL_PRI (S504). Furthermore, each node assigns a transmission priority to each mobile terminal in order of the smaller final calculated priority value TOTAL_PRI (S505).

Such a transmission priority determination is made by each mobile terminal. Since the mobile terminals exchange the ATIM frame with each other, results of the transmission priority calculation are the same.

The data transmission window is initiated (S506) and the mobile terminal having the highest transmission priority, which is assigned in S505, begins first to transmit a data packet (S507). In the data transmission window, the mobile terminal exclusively transmits the data packet. After transmitting the data packet, the mobile terminal determines whether data packet transmission is completed. The terminal which has completed packet transmission resets the number of the continuous transmission failures, the PRI value, to 0 and is switched to the doze state (S508).

After a predetermined time elapses, each node determines whether the data transmission window is terminated (S509). If the data transmission window is terminated, the mobile terminal stops transmitting the packet. Mobile terminals that currently are in the awake state do not complete data packet transmission or do not have a chance to transmit a data packet. The mobile terminals in the awake state increment their number of continuous transmission failures, the PRI value, by one (S510).

As in FIG. 4, a determination is made as to whether there is a mobile terminal attempting to communicate in the ad-hoc network (S511). If such a mobile terminal is found, an ATIM window of a new beacon interval is initiated (S501), and all mobile terminals in the wireless network, including those in the doze state, are switched to the awake state (S502). Of course, if there are no mobile terminals attempting to communicate, the process ends.

Figure 6:
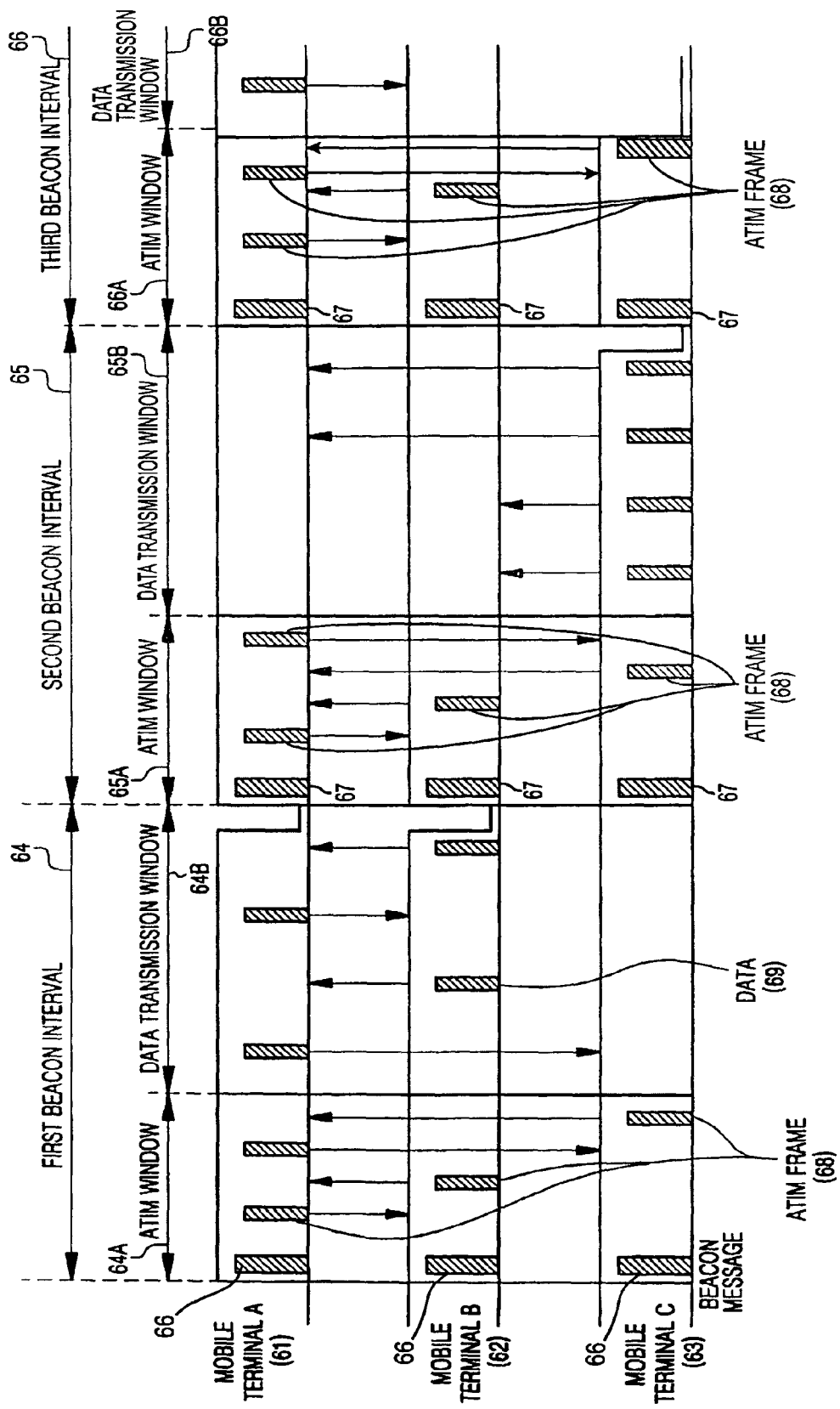
FIG. 6 is a diagram of an example of a packet transmission method according to another exemplary embodiment of the present invention.

FIG. 6 is a diagram of an example of a packet transmission method according to another exemplary embodiment of the present invention.

Referring to FIG. 6, there are a mobile terminal A 61, a mobile terminal B 62, and a mobile terminal C 63. The mobile terminal A 61 has two packets to be transmitted to the mobile terminals B 62 and C 63, respectively. The mobile terminal B 62 has two packets to be transmitted to the mobile terminal A 61. The mobile terminal C 63 has four transmission packets, two to be transmitted to the mobile terminal A 61 and other two to be transmitted to the mobile terminal B 62.

The first beacon interval 64 is initiated by transmission and reception of the beacon message 66. When the ATIM window 64A of the first beacon interval is initiated, each of the mobile terminals 61, 62 and 63 exchanges an ATIM frame with the other two terminals. For example, the mobile terminals A 61, B 62 and C 63 exchange ATIM frames 68, including an NUM field having values of 2, 2 and 4, respectively, with each other. In the first beacon interval 64, the PRI field in the ATIM frame 68 for all of the terminals has a value of 0. If TOTAL_PRI of each terminal is calculated based on the exchanged PRI field and NUM field, values of 2, 2 and 4 are obtained for terminals A61, B62 and C 63, respectively. Thus, the mobile terminals A 61 and B 62 have a higher transmission priority than the mobile terminal C63.

When the data transmission window 64B is initiated, the mobile terminals A 61 and B 62 transmit the data packet 69 through competition. As shown in FIG. 6, in the data transmission window 64B, the data packets 69 are sequentially transmitted from the terminal A 61 to the terminal C 63, from the terminal B 62 to the terminal A 61, from the terminal A 61 to the terminal B 62, and from the terminal B 62 to the terminal A 61.

In the data transmission window 64B, the mobile terminals A 61 and B 62 complete data packet transmission. Accordingly, the mobile terminals A 61 and B 62 reset their PRI values to 0 and are switched to the doze state. Meanwhile, since the mobile terminal C 63 does not have a chance for packet transmission, it increments its PRI value by one when the data transmission window 64B is terminated.

It is assumed that, in the first beacon interval 64, packets to be transmitted to the mobile terminal B 62 are added to the mobile terminal A 61, and packets to be transmitted to the mobile terminal A 61 are added to the mobile terminal B 62.

When the ATIM window 65A of the second beacon interval 65 is initiated through exchange of the beacon message 67, the terminals 61, 62 and 63 exchange the ATIM frames 68 with each other. In this case, since the mobile terminals A 61 and B 62 each have one packet added to be transmitted, their NUM values become 1. Since the packet transmission is completed in the first beacon interval 64, the PRI value becomes 0. On the other hand, in the case of the mobile terminal C 63, the NUM value becomes 4 and the PRI value becomes 1. When the final priority values TOTAL_PRI of the mobile terminals A 61, B 62 and C 63 are calculated based on the NUM and PRI values of the exchanged ATIM frame 68, values of 1, 1, and 0.4 are obtained for terminals A 61, B 62 and C 63, respectively. Accordingly, the mobile 7 terminal C 63 has the highest priority.

When the data transmission window 65B is initiated, the mobile terminal C 63 transmits two packets to each of the mobile terminals A 61 and B 62. The mobile terminal C 63 can complete data transmission in the data transmission window 65B and reset its PRI value to 0. On the other hand, since the mobile terminals A 61 and B 62 have a packet transmission chance, they increment their PRI value by one and the data transmission window 65B is terminated as shown in FIG. 6.

If an ATIM window 66A of the third beacon interval 66 is initiated through exchange of further beacon message 67, the mobile terminals A 61, B 62 and C 63 exchange an ATIM frame 68 with each other. For the mobile terminals A 61, B 62 and C 63, the NUM values become 1, 1 and 0, respectively, and the PRI values become 1, 1 and 0, respectively. When the final priority value TOTAL_PRI is calculated based on the NUM and PRI values, values of 0.1, 0.1 and 0 are obtained for terminals A 61, B 62 and C 63, respectively. Since the mobile terminals A 61 and B 62 have the same transmission priority, those terminals transmit and receive packets through free competition when the data transmission window 66B is initiated.

Of course, since the mobile terminal C 63 has no packets to transmit and receive, it enters the doze state when the data transmission window 66B is initiated.

In the example, when the mobile terminal C 63 has no chance for transmission in the first beacon interval 64, it is assigned a higher transmission priority in the second beacon interval 65 so as to transmit a data packet. Accordingly, the use of the packet transmission method of FIG. 5 can prevent abnormal performance.

Figure 7:
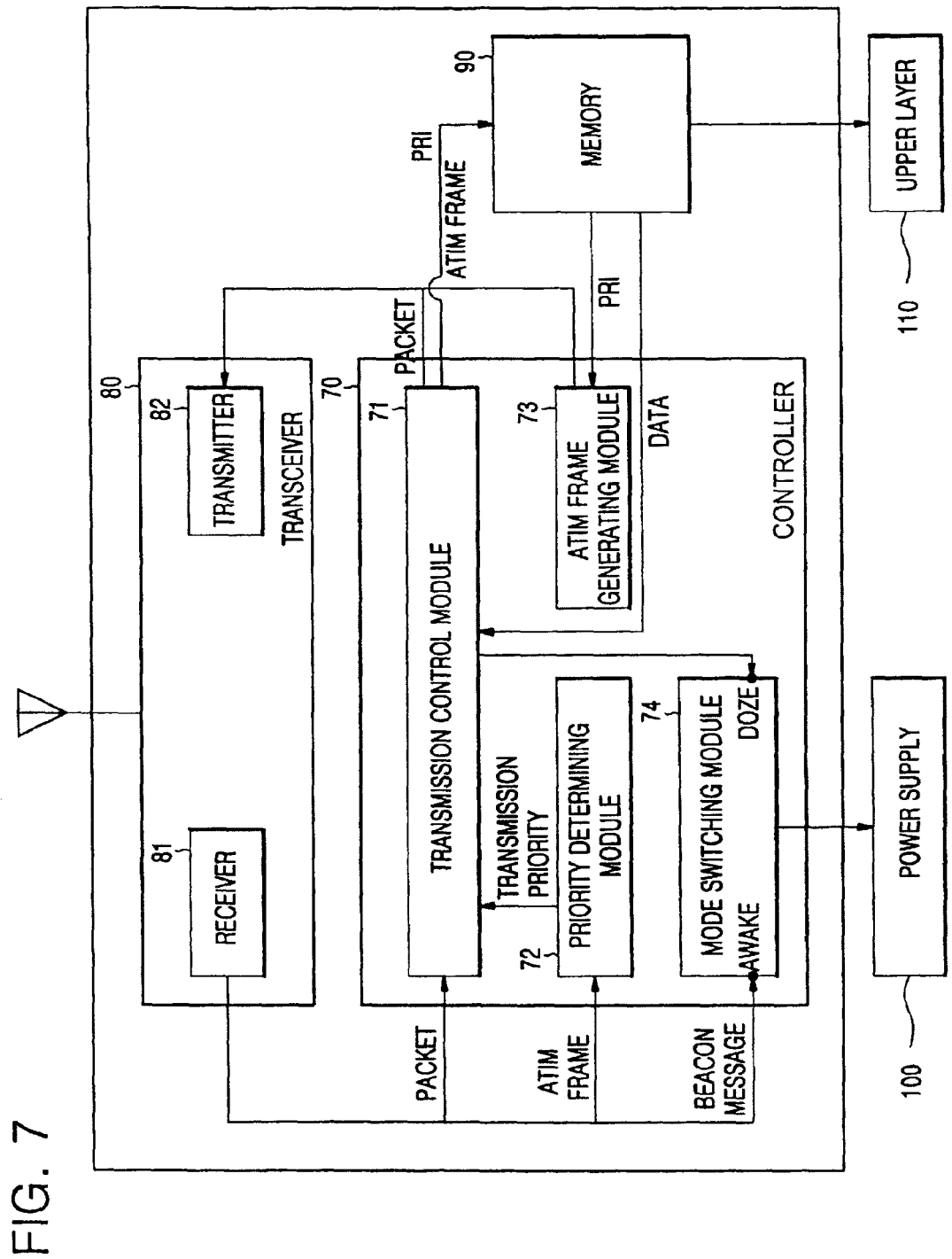
FIG. 7 is a block diagram of a medium access control protocol (MAC) protocol layer of a mobile terminal according to an exemplary embodiment of the present invention.

FIG. 7 is a block diagram illustrating a MAC protocol layer of a mobile terminal according to an exemplary embodiment of the present invention.

Referring to FIG. 7, the structure of the MAC protocol layer of the mobile terminal includes a controller 70, a transceiver 80, a memory 90, and a power supply 100.

The transceiver 80 includes a receiver 81 and a transmitter 82. The transceiver 80 transmits and receives packets to and from other mobile terminals on a wireless network. The memory 90 acts as a buffer, and temporarily stores data and a PRI value to be transmitted from an upper layer to other terminals.

The controller 70 controls all packet transmission according to the present invention. The controller 70 may include a transmission control module 71, a priority determining module 72, an ATIM frame generating module 73, and a mode switching module 74.

When a beacon message is received via the receiver 81, the mode switching module 74 in the controller 70 switches the receiving terminal to the awake state. In this respect, the mode switching module 74 may control the power supply 100 to supply a voltage. Furthermore, the ATIM frame generating module 73 generates an ATIM frame having the format as shown in FIG. 2. The ATIM frame generating module 73 recognizes the number of packets to be transmitted, and inserts a value indicating that number into the NUM field of the ATIM frame. Furthermore, the ATIM frame generating module 73 receives the PRI value stored in the memory 90 so as to generate the ATIM frame. The thus generated ATIM frame is transmitted to all terminals in the wireless network via the transmitter 82.

Meanwhile, the priority determining module 72 parses the ATIM frames of other mobile terminals received via the receiver 81 to determine a transmission priority for each terminal. That is, the priority determining module 72 calculates $TOTAL\_PRI = NUM/10^{pri}$ based on the NUM field and the PRI value of the ATIM frame for each terminal. As described above, the lower the TOTAL_PRI that the terminal has, the higher transmission priority it has. The priority determining module 72 notifies the transmission control module 71 of the calculated transmission priority.

In the data transmission window, the transmission control module 71 receives data to transmit from the upper layer 110, occupies a medium according to the transmission priority, and transmits the data.

If the data packet transmission is completed in the data transmission window, the transmission control module 71 sends a notification indicating that data transmission is completed to other terminals, and the next terminal begins to transmit. Furthermore, the transmission control module 71 resets the PRI value stored in the memory 90 to zero, and controls the mode switching module 74 to switch the mobile terminal to the doze state. In this respect, the mode switching module 74 can switch the terminal to the doze state by blocking the voltage from the power supply 100.

However, when the data transmission is not completed and the data transmission window is terminated in the awake state, the transmission control module 71 increments the PRI value stored in the memory 90 by one.

A new beacon interval is initiated, the beacon message is transmitted to all mode switching modules 74 via the receiver 81, and the packet is transmitted through the above-described operations. With the above-described mobile terminal, it is possible to perform the packet transmission method according to the present invention.

As described above, with the method and apparatus for transmitting packets in the mobile ad-hoc network according to the present invention, it is possible to reduce a phenomenon of abnormality by mobile terminals exchanging with each other an ATIM frame containing information about the number of packets attempted to be transmitted and information about the number of continuous transmission failures in the ATIM window period, and by determining transmission priorities of the mobile terminals by considering that information. Thus, each mobile terminal can fairly transmit data, thereby saving energy and improving quality of service (QoS).

While the present invention has been described with reference to exemplary embodiments thereof, it will be understood by those skilled in the art that various changes in form and detail may be made therein without departing from the scope of the present invention as defined by the following claims.

What is claimed is:

1. A method for transmitting packets between terminals belonging to a mobile ad-hoc network, the method comprising:

exchanging, by terminals in an ad-hoc network, information about a number of packets to be transmitted and a number of continuous transmission failures between the terminals;

determining, at each terminal, an inter-terminal transmission priority based on the information about the number of packets to be transmitted and the number of continuous transmission failures; and transmitting and receiving, at each terminal, packets according to the determined transmission priority, wherein the exchanging comprises transmitting, between the terminals, an Ad-hoc Traffic Indication Message (ATIM) frame comprising the information about the number of packets to be transmitted and the number of continuous transmission failures, and wherein determining the inter-terminal transmission priority comprises assigning a higher transmission priority to a terminal having a smaller final priority value calculated by the following equation:

$$TOTAL\ PRI = NUM/10^{pri},$$

where TOTAL PRI is a final priority value, NUM is the number of packets to be transmitted, and PRI is the number of continuous transmission failures.

2. The method of claim 1, wherein exchanging, by the terminals in the ad-hoc network, information about a number of packets to be transmitted and a number of continuous transmission failures between the terminals is executed in an ATIM window.

3. The method of claim 1, wherein transmitting and receiving, at each terminal, packets according to the determined transmission priority is executed in a data transmission window which follows an ATIM window.

4. The method of claim 3, further comprising:

incrementing, by a terminal that does not complete packet transmission in the data transmission window, the number of continuous transmission failures by one; and resetting, by a terminal that completes packet transmission in the data transmission window, the number of continuous transmission failures to 0.

5. The method of claim 3, further comprising switching a terminal having no packet to be transmitted in the data transmission window to a doze state.

6. The method of claim 3, further comprising switching a terminal which has completed packet transmission in the data transmission window to a doze state.

7. The method of claim 6, further comprising switching the terminal which has been switched to the doze state to the awake state in response to initiation of a next ATIM window.

8. The method of claim 1, wherein exchanging information about a number of packets to be transmitted and a number of continuous transmission failures further comprises:

transmitting, by a terminal receiving the ATIM frame, an acknowledgement signal to the transmitting terminal.

9. A terminal for transmitting and receiving packets in an ad-hoc network, the terminal comprising:

a packet transceiver to transmit and receive packets according to an ad-hoc mode; and a controller to control exchanging information about a number of packets to be transmitted and a number of continuous transmission failures with other terminals in an ad-hoc network to determine an inter-terminal transmission priority, and to control transmitting and receiving the packets according to the determined transmission priority, wherein exchanging information comprises transmitting, by the packet transceiver, an Ad-hoc Traffic Indication Message (ATIM) frame comprising the information about the number of packets to be transmitted and the number of continuous transmission failures, and wherein the controller comprises:

an Ad-hoc Traffic Indication Message (ATIM) frame generating module to generate the ATIM frame comprising the information about the number of packets to be transmitted and the number of continuous transmission failures;

a priority determining module to receive the ATIM frame comprising the information about the number of packets to be transmitted and the number of continuous transmission failures from other terminals in the ad-hoc network, and to determine an inter-terminal transmission priority based on the information; and a transmission control module to occupy a medium to control transmitting a data packet according to the determined transmission priority, and wherein the priority determining module assigns a higher transmission priority to a terminal having a smaller final priority value calculated by the following equation:

$$TOTAL\ PRI = NUM/10^{pri},$$

where TOTAL PRI is a final priority value, NUM is the number of packets to be transmitted, and PRI is the number of continuous transmission failures.

10. The method of claim 9, wherein the transmission control module controls transmission of a data packet according to the determined transmission priority in a data transmission window.

11. The terminal of claim 10, wherein the transmission control module increments the number of continuous transmission failures by one when packet transmission is not completed in the data transmission window, and resets the number of continuous transmission failures to zero when the packet transmission is completed in the data transmission window.

12. The terminal of claim 9, wherein the controller comprises a mode switching module to switch a terminal to a doze state when no packet is to be transmitted by the terminal in the data transmission window.

13. The terminal of claim 12, wherein the mode switching module switches the terminal to an awake state in response to initiation of an ATIM window.

14. The terminal of claim 9, wherein the controller comprises a mode switching module to switch a terminal to a doze state in response to completion of packet transmission by the terminal in the data transmission window.

15. The terminal of claim 14, wherein the mode switching module switches the terminal to an awake state in response to initiation of an ATIM window.

* * * * *